(12) United States Patent
Roescher

(10) Patent No.: US 6,820,538 B2
(45) Date of Patent: Nov. 23, 2004

(54) COMBINATION GRILL AND FOOD SMOKER

(76) Inventor: Shannon Roescher, 2199 Vivid Ct., Stone Mountain, GA (US) 30087

(*) Notice: Subject to any disclaimer, the term of this patent is extended or adjusted under 35 U.S.C. 154(b) by 7 days.

(21) Appl. No.: 10/393,742

(22) Filed: Mar. 21, 2003

(65) Prior Publication Data
US 2003/0150336 A1 Aug. 14, 2003

(51) Int. Cl.⁷ ............................................. A47J 27/62
(52) U.S. Cl. ............................. 99/340; 99/450; 99/482
(58) Field of Search ........................ 99/330, 339, 340, 99/352–355, 400, 401, 444–450, 481, 482; 126/25 R, 9 R, 41 R

(56) References Cited

U.S. PATENT DOCUMENTS

| | | | |
|---|---|---|---|
| 2,568,022 A | 9/1951 | Parker | |
| 2,790,380 A | 4/1957 | Shryack | |
| 2,867,208 A | 1/1959 | True et al. | |
| 4,175,484 A | 11/1979 | Tobey | |
| 4,430,985 A | 2/1984 | Huneycutt | |
| 4,664,026 A | 5/1987 | Milloy | |
| 4,665,891 A | 5/1987 | Nemec et al. | |
| 4,791,909 A | 12/1988 | Kalthoff | |
| 4,934,260 A | 6/1990 | Blevins | |
| 5,195,423 A | 3/1993 | Beller | |
| D341,988 S | 12/1993 | Endres | |
| 5,460,159 A | * 10/1995 | Bussey | 126/25 R |
| 6,012,381 A | * 1/2000 | Hawn | 99/340 |
| D430,772 S | 9/2000 | Ganard | |
| 6,209,533 B1 | 4/2001 | Ganard | |
| 6,257,130 B1 | 7/2001 | Schlosser | |
| 6,626,089 B1 | * 9/2003 | Hubert | 99/339 |

* cited by examiner

Primary Examiner—Timothy F. Simone
(74) Attorney, Agent, or Firm—Myers & Kaplan, LLC; Ashish D. Patel; Joel D. Myers

(57) ABSTRACT

A combination grill and food smoker having a dual smoker chamber configuration in fluid or vented communication with the grilling chamber of a grill, wherein the dual smoker chamber configuration functions in association with a generally centrally disposed smoke stack and a smoker particle smoldering rate regulatory means to ensure even dispersion of heat and smoke throughout the grilling chamber of a grill for even cooking and flavoring of meats, fish, vegetables, or the like, therein.

29 Claims, 6 Drawing Sheets

US 6,820,538 B2

COMBINATION GRILL AND FOOD SMOKER

TECHNICAL FIELD

The present invention relates generally to food grilling assemblies, and more specifically to a combination grill and food smoker having a dual firebox configuration. The present invention is particularly suitable for, although not strictly limited to, ensuring even dispersion of heat and smoke throughout the grilling chamber of a grill, thus permitting even cooking and flavoring of meats, or the like, therein.

BACKGROUND OF THE INVENTION

Barbeque grills, or grilling assemblies in general, have always been a popular form of cooking meats, fish, vegetables, or the like, wherein such widespread use of grills has spurred the engineering of grilling assemblies with configurations and additions that optimize the food cooking and grilling experience.

One such functional configuration and addition to grilling assemblies has been the incorporation of smoker chambers for the dispersion of heat and smoke through the grilling chamber of a grill, wherein such smoker chambers serve to heat and smoke food therein, thus imparting or infusing the grilled food with a desired smoky flavor.

However, the configuration of most available grills with food smokers disadvantageously lends to uneven smoking and cooking of food within the grilling chamber of the grill, thus making their use inefficient, impractical and problematic. Specifically, most available grill and smoker units possess a smoker chamber positioned adjacent to and in fluid or vented communication with the grilling chamber of the grill, thus permitting smoke released from the smoker chamber to traverse the grilling chamber, wherein a smoke stack, also in fluid or vented communication with the grilling chamber, but positioned opposite the smoker chamber, functions as an airway to permit the release of smoke accumulated within the grilling chamber, continually expelling smoke therefrom as it travels thereacross and therethrough.

As such, due to the opposing configuration of the smoker chamber from the smoke stack on such grills, the internal temperature of the grilling chamber varies from zone-to-zone. More specifically, regions of undesirably low temperatures develop generally immediate the smoker chamber and immediate the smoke stack, as the airflow proximal these regions moves at a faster rate in comparison to the slower moving air proximal the mid-region of the grilling chamber. As a result, operators of such grills are often forced to either continually rotate their meats to ensure even cooking and smoking thereof, or to cook their meats within a central area on the grilling grate of the grilling chamber where cooking temperature is more acceptable, thus significantly reducing otherwise useable grill space.

An additional concern of such grill and smoker units is the absence of an efficient smoker chamber that provides a longer and/or better burn rate of smoker particles (i.e., wood chips, or the like) therewithin, thus affecting the overall temperature and quantity of smoke released therefrom. As a result, if smoker particles within the smoker chamber smolder too quickly, food within the grilling chamber may not adequately cook or be infused with the desired smoky flavor, thus requiring the operator of the grill to continually and burdensomely monitor the quantity of smoker particles within the smoker chamber, adding more smoker particles thereto upon depletion of same. Should smoker particles within the smoker chamber smolder too slowly, however, food within the grilling chamber may take longer to cook, thus increasing the time required for infusion of the food with desired smoky flavor, and potentially causing the meat to lose tenderness, or "dry out." As such, it appears that most commonly available smoker units are unable to efficiently utilize smoker particles, thus leading to excess use and/or waste of same.

Therefore, it is readily apparent that there is a need for a combination grill and food smoker that provides even dispersion of heat and smoke throughout the grilling chamber of a grill, and a more efficient smoker chamber that provides a longer and better burn rate of smoker particles therewithin, thus permitting even cooking and flavoring of meats, fish, vegetables, or the like, within the grilling chamber.

BRIEF SUMMARY OF THE INVENTION

Briefly described, in a preferred embodiment, the present invention overcomes the above-mentioned disadvantages and meets the recognized need for such a device by providing a combination grill and food smoker having a dual smoker chamber configuration in fluid or vented communication with the grilling chamber of a grill, wherein the dual smoker chamber configuration functions in association with a generally centrally disposed smoke stack and a smoker particle smoldering rate regulatory means to ensure even dispersion of heat and smoke throughout the grilling chamber of a grill for even cooking and flavoring of meats, fish, vegetables, or the like, therein.

According to its major aspects and broadly stated, the present invention in its preferred form is a combination grill and food smoker having, in general, a grilling chamber, a smoke stack, and smoker chambers having a regulatory means for controlling the smoldering rate of smoker particles therewithin.

More specifically, the present invention is a combination grill and food smoker having a hooded grilling chamber with a centrally disposed smoke stack in vented communication therewith. Preferably, a first and second smoker chamber flank the grilling chamber and are also in fluid or vented communication therewith, thus permitting smoke generated from the smoldering of smoker particles within the smoker chambers to be released into the grilling chamber from both sides thereof. Preferably, each smoker chamber is structurally and functionally designed to provide a more efficient, longer and better burn rate of smoker particles therewithin. Preferably, each smoker chamber possesses a regulatory means for controlling the smoldering rate of smoker particles therewithin, wherein the regulatory means is preferably a separate venting chamber positioned below each smoker chamber. Preferably each venting chamber possesses a sliding door for regulating the quantity of air being introduced into the smoker chamber, thereby also regulating the rate of burning/smoldering of smoker particles therein, and thus, the amount of heat and smoke being released thereby. The centrally disposed smoke stack preferably ensures that smoke released from both smoker chambers into the grilling chamber is permitted to first travel uniformly therein, and thereafter be expelled therefrom.

Accordingly, a feature and advantage of the present invention is its ability to ensure even dispersion of heat and smoke throughout the grilling chamber of a grill for even cooking and flavoring of meats, fish, vegetables, or the like, therein.

Another feature and advantage of the present invention is its dual smoker chamber configuration.

Another feature and advantage of the present invention is its ability to provide smoker chambers having a structurally and functionally novel design that promotes a more efficient, longer and better burn rate of smoker particles therewithin.

Another feature and advantage of the present invention is its centrally disposed smoke stack that ensures that the smoke released from both smoker chambers into the grilling chamber is permitted to first travel uniformly therein, and thereafter be expelled therefrom.

Another feature and advantage of the present invention is its provision of a slidably removable grilling grate.

Another feature and advantage of the present invention is its simplicity of design.

These and other objects, features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1–6, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
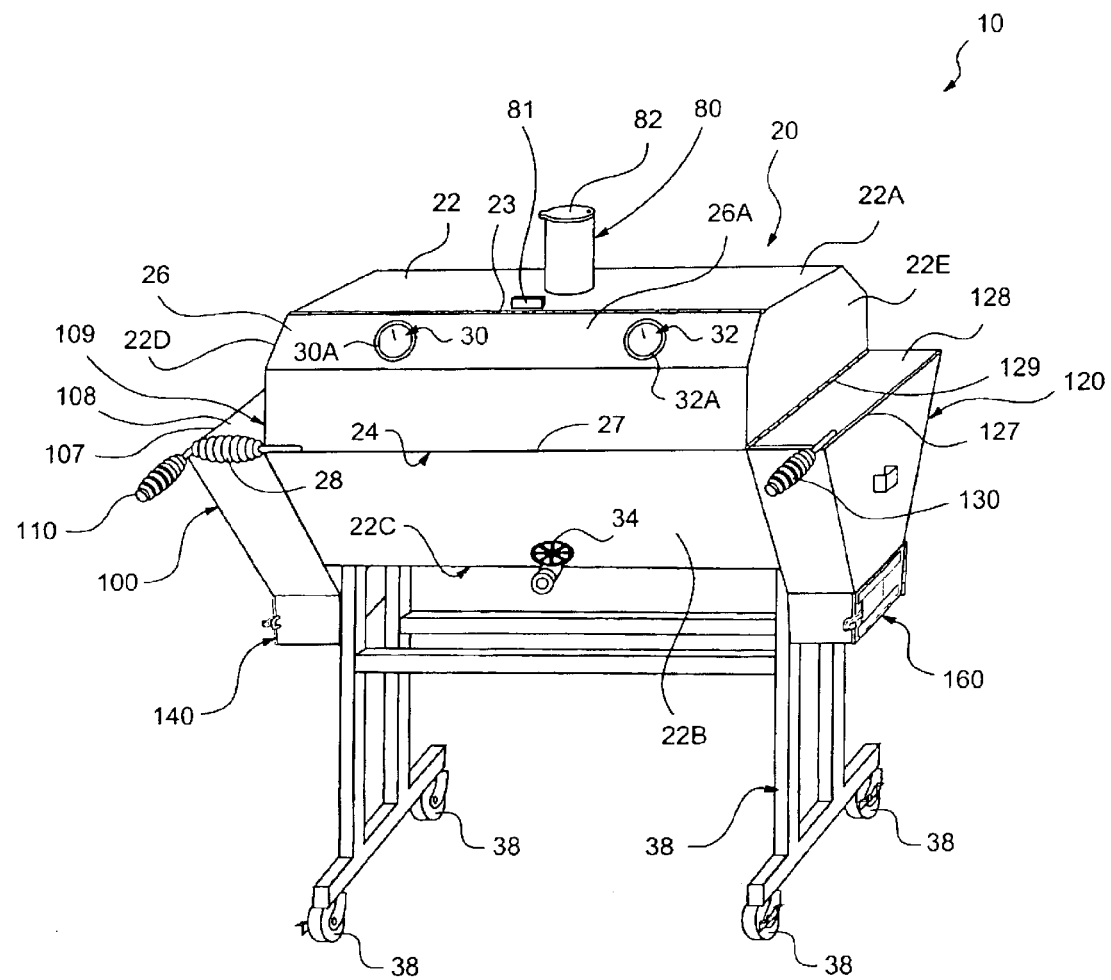
FIG. 1 is a perspective view of a combination grill and food smoker according to a preferred embodiment of the present invention.
Figure 2:
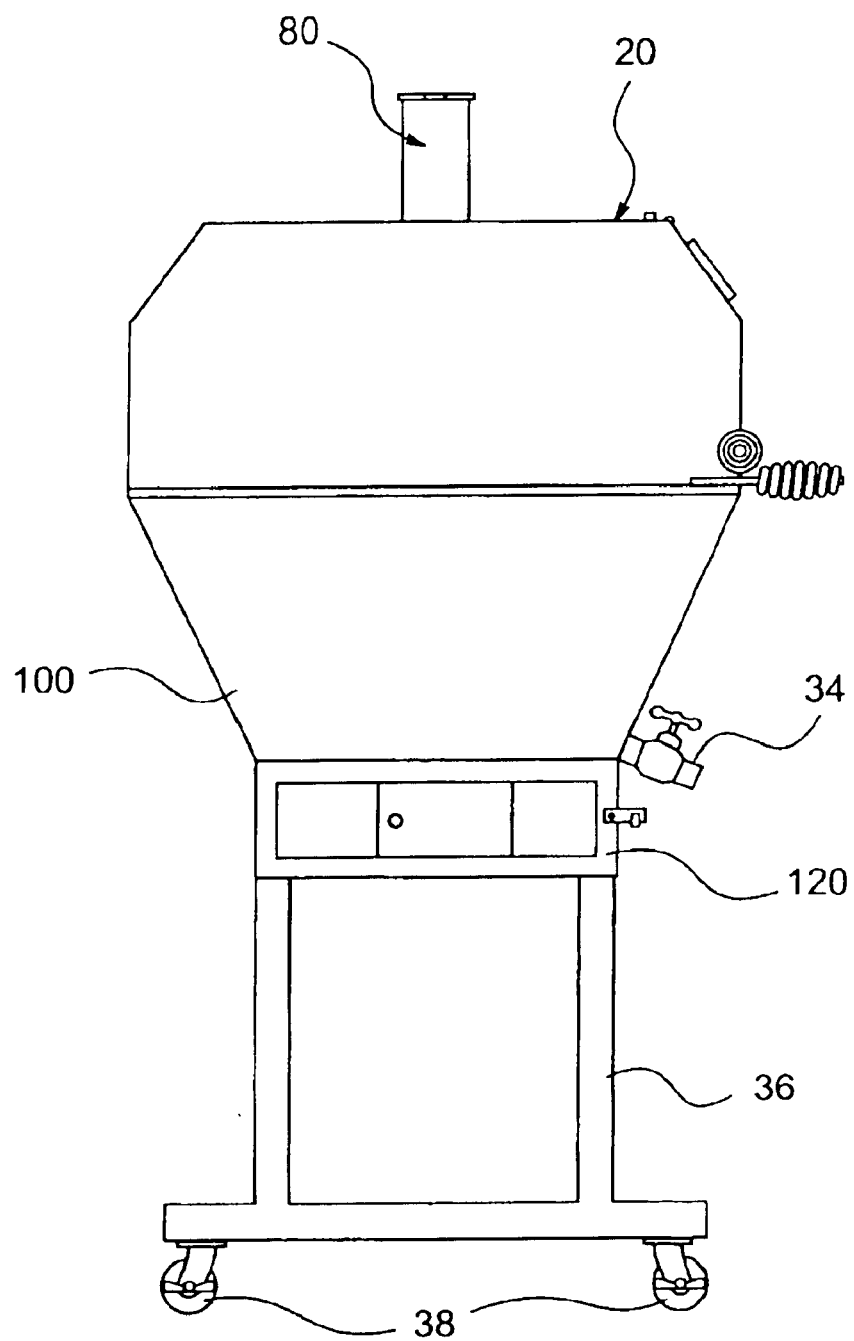
FIG. 2 is a side view of a combination grill and food smoker according to a preferred embodiment of the present invention.

Referring now to FIGS. 1–2, the present invention in a preferred embodiment is an apparatus 10, wherein apparatus 10 is a combination grill and food smoker having grilling chamber 20, smoke stack 80, and smoker chambers 100 and 120 having air regulatory means 140 and 160, respectively, for controlling the smoldering rate of smoker particles therewithin. Preferably, grilling chamber 20, smoke stack 80, smoker chambers 100 and 120, and regulatory means 140 and 160, are manufactured from any suitable metal, such as, for exemplary purposes only, steel or iron; although other suitable materials could be utilized such as, clay, ceramic material, or other suitable metal or non-metal materials.

Preferably, grilling chamber 20 is substantially octagonal-shaped and possesses exterior surface 22 and interior space 24, wherein interior space 24 is preferably accessible via cover 26, hingably secured to upper surface 22A of exterior surface 22 via hinge mechanism 23. To assist in the upward hinged movement of cover 26 for user-accessibility into interior space 24, front edge 27 of cover 26 preferably possesses handle 28 affixed thereto via welding, riveting, or the like. Additionally, cover 26 further possesses stopper 81 that preferably contacts upper surface 22A of exterior surface 22 upon full upward and rearward extension of cover 26, thus limiting excess rearward movement of same.

Preferably positioned on and extending though front surface 26A of cover 26 are thermometers 30 and 32, strategically distanced from one another to optimize reading of the internal heat temperatures of internal space 24 generated therein as a function of the smoldering rate of smoker particles within smoker chambers 100 and 120, as more fully described below. Specifically, gauge portions 30A and 32A of thermometers 30 and 32, respectively, are preferably visible from front surface 26A of cover 26, wherein temperature or heat-sensing ends 30B and 32B of thermometers 30 and 32, respectively, preferably extend through front surface 26A of cover 26, and are preferably visible from rear surface 26B of cover 26 to facilitate the measuring of the internal temperature of grilling chamber 20, as is known within the art.

Preferably centrally positioned on upper surface 22A of exterior surface 22 is smoke stack 80 in fluid or vented communication with interior space 24 of grilling chamber 20 for venting or releasing therefrom excess smoke and heat generated therein as a function of the smoldering rate of smoker particles within smoker chambers 100 and 120, as more fully described below. Preferably, lid 82 is pivotally connected to smoke stack 80 for selectively adjusting the ventilation and expelling of smoke and heat therefrom, and thus, assisting in the regulation of the internal temperature of grilling chamber 24.

Preferably, frontally disposed on lower surface 22B of exterior surface 22 is drainage tap 34, preferably utilized to drain water from within grilling chamber 20 originally introduced therein for cleaning purposes and/or for purposes of retaining moisture within grilling chamber 24 during the grilling process, thereby permitting grilled meats or foods to retain moisture and tenderness.

Preferably, grilling chamber 20 is supported via generally H-shaped support structure 36, secured to bottom surface 22C of grilling chamber 20, wherein support structure 36 preferably possesses lockable wheels 38 for facilitating the wheeled transport of apparatus 10 to a desired location. It is contemplated that support structure 36 could be any other suitable support structure capable of effectively supporting grilling chamber 20.

Figure 3:
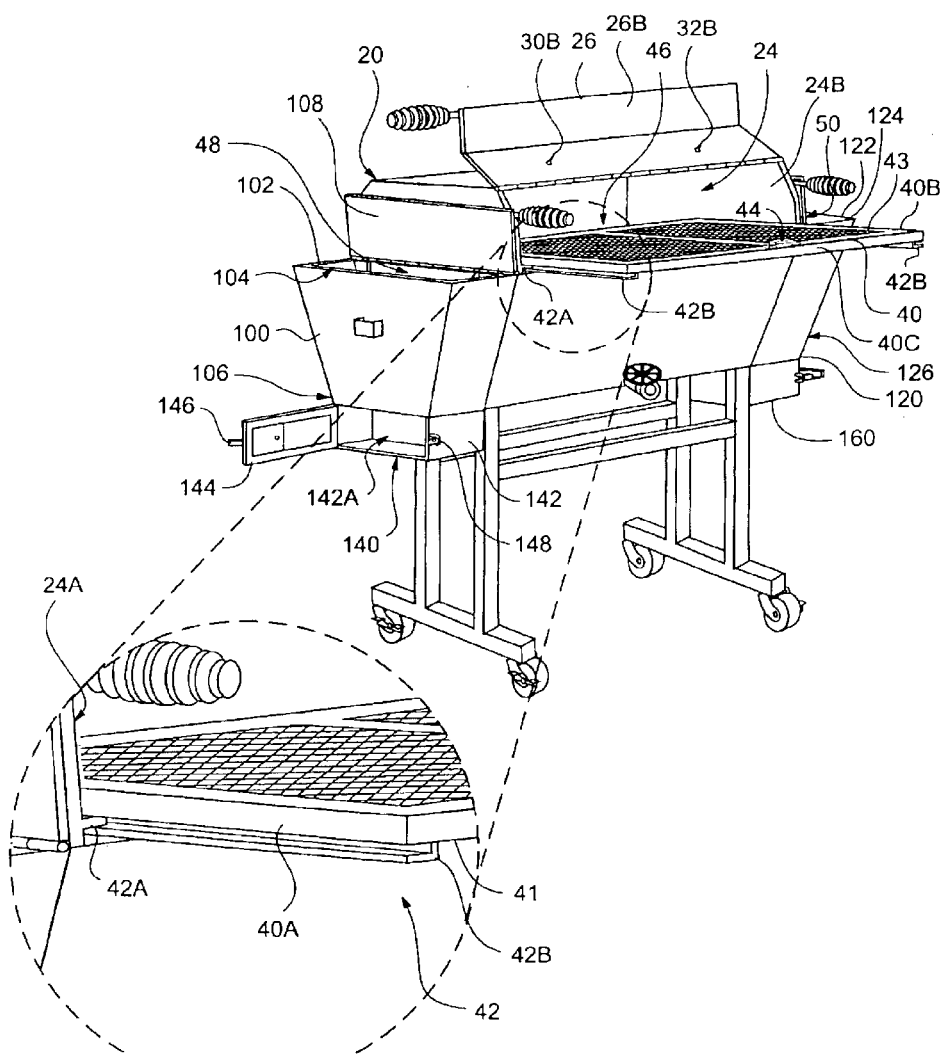
FIG. 3 is a perspective view of a combination grill and food smoker according to a preferred embodiment of the present invention.

As best illustrated in FIG. 3, interior space 24 of grilling chamber 20 preferably houses grilling grate 40, slidably engaged therewith via ridge-and-channel mechanisms 42, wherein ridge portions 42A of ridge-and-channel mechanisms 42 are preferably formed on opposing inner wall surfaces 24A and 24B of grilling chamber 20, and wherein channel portions 42B of ridge-and-channel mechanisms 42 are preferably formed on underside 41 of grilling grate 40, proximal opposing edges 40A and 40B. Preferably, to facilitate slidable interaction of grilling grate 40 with grilling chamber 20, handle 44 is preferably disposed on top side 43 of grilling grate 40, proximal edge 40C thereof. Slidably removable grilling grate 40 preferably permits an operator of apparatus 10 to easily access all areas of grilling grate 40, thus increasing the total functional cooking area thereof. Although ridge-and-channel mechanisms 42 are preferably utilized to slidable engage grilling grate 40 with interior space 24 of grilling chamber 20, it is contemplated in an alternate embodiment that other suitable slider mechanisms could be utilized, such as, for exemplary purposes only, bearing assemblies or channel-and-wheel mechanisms.

Preferably, in a retracted position, grilling grate 40 sits substantially over trough or basin area 46 of interior space 24 of grilling chamber 20, wherein basin area 46 preferably functions to receive and retain charcoal, water, or the like, and wherein heat emanated from smoldering charcoal, or moisture from evaporating water, preferably passes through grilling grate 40 for the cooking of food/meats placed thereon, as is known within the art.

Preferably formed through sides 22D and 22E of exterior surface 22 of grilling chamber 20 are generally rectangular-shaped apertures 48 and 50, respectively, wherein apertures 48 and 50 are preferably in direct fluid or vented communication with basin area 46 of interior space 24, and in direct fluid or vented communication with smoker chambers 100 and 120, respectively. Preferably, smoke and heat generated from smoker particles smoldering within smoker chambers 100 and 120 are introduced into basin area 46, and interior space 24 in general, via apertures 48 and 50, respectively, for purposes as more fully described below.

Figure 4:
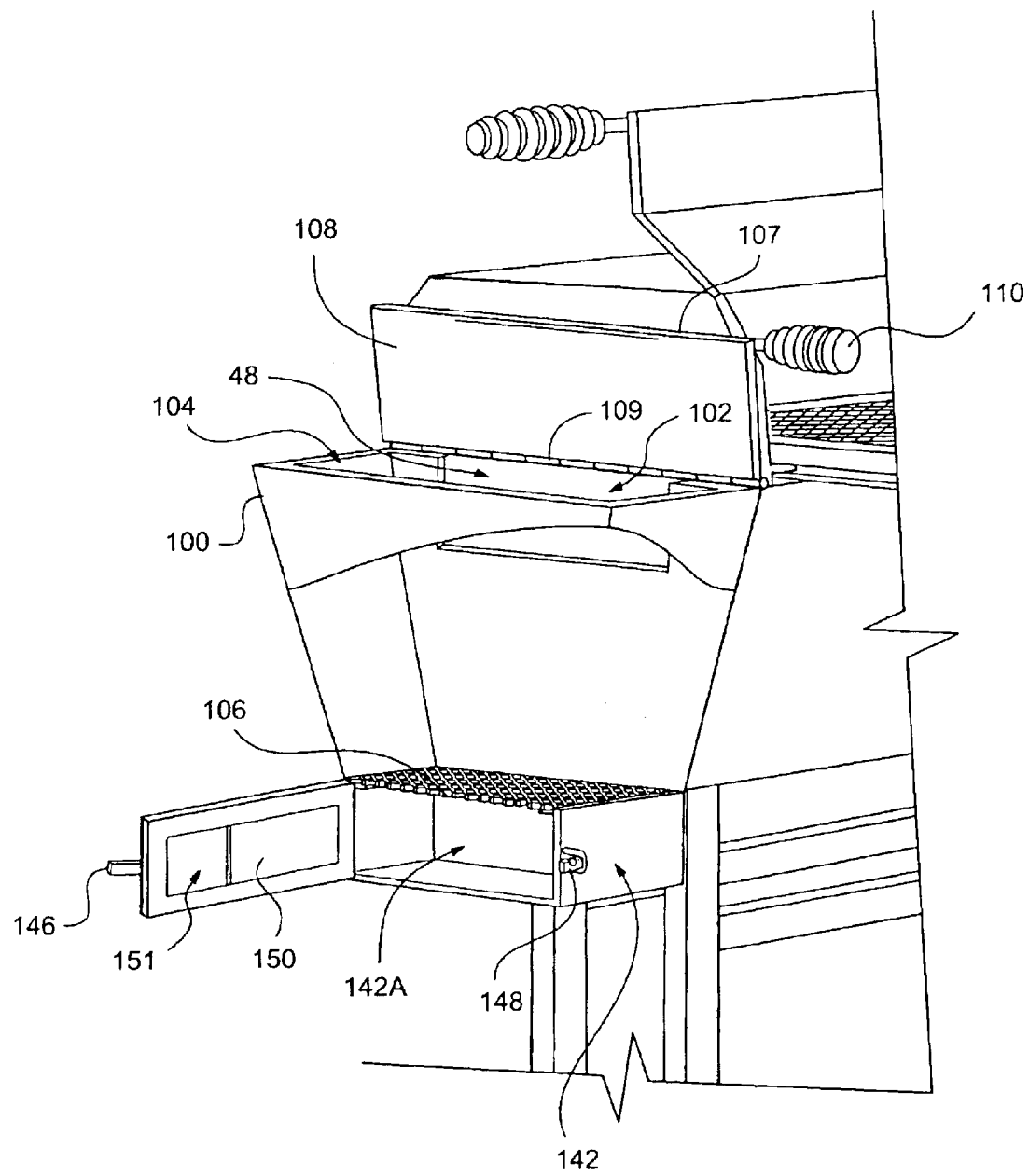
FIG. 4 is a cutaway and partial perspective view of a combination grill and food smoker according to a preferred embodiment of the present invention.

Preferably, smoker chambers 100 and 120 are securely positioned on sides 22D and 22E, respectively, of grilling chamber 20, and over apertures 48 and 50, respectively. Preferably, smoker chambers 100 and 120 are substantially funnel or inverted-trapezoidal-shaped, possessing mouths 102 and 122, respectively, for receipt and introduction of smoker particles into inner cavities 104 and 124, respectively, thereof. Preferably, smoker particles deposited into inner cavities 104 and 124 are supported on mesh-like grates 106 and 126, respectively, thereof, wherein mesh-like grates 106 and 126 are preferably in direct vented or fluid communication with air regulatory means 140 and 160, respectively, securely positioned beneath smoker chambers 100 and 120, respectively, as more fully described below, and as best illustrated in FIG. 4.

Preferably the structurally and functionally novel funnel or inverted-trapezoidal-shape of smoker chambers 100 and 120 promotes a more efficient, longer and better burn rate of smoker particles therewithin, as a higher and denser accumulation of smoker particles is created in the lower portions of inner cavities 104 and 124 of smoker chambers 100 and 120, respectively, proximal grates 106 and 126, respectively, thereof. Such a shape and configuration of smoker chambers 100 and 120 reduces both the effective quantity of smoker particles required for any given grilling session, and the frequency of smoker particle replenishment, in comparison to prior art smoker chambers that generally require frequent replenishment of smoker particles, and generally do not provide even smoldering of the smoker particles placed therein as a result of a less efficiently shaped smoker chamber.

Preferably, mouth 102 of smoker chamber 100 is coverable via cover 108, hingably secured to smoker chamber 100 via hinge mechanism 109. To assist in the upward hinged movement of cover 108 for deposit of smoker particles into inner cavity 104 of smoker chamber 100, front edge 107 of cover 108 preferably possesses handle 110 affixed thereto via welding, riveting, or the like. Similarly, mouth 122 of smoker chamber 120 is coverable via cover 128, hingably secured to smoker chamber 120 via hinge mechanism 129. Likewise, to assist in the upward hinged movement of cover 128 for deposit of smoker particles into inner cavity 124 of smoker chamber 120, front edge 127 of cover 128 preferably possesses handle 130 affixed thereto via welding, riveting, or the like.

Preferably, air regulatory means 140 and 160 are securely positioned beneath smoker chambers 100 and 120, respectively, wherein air regulatory means 140 and 160 function to regulate the quantity of air being introduced into smoker chambers 100 and 120, respectively, thereby assisting in the regulation of burning/smoldering rate of smoker particles therein, and thus, the amount of heat and smoke released thereby. Preferably, air regulatory means 140 possesses venting chamber 142 having hinged door 144, lockable thereto via interaction of pivotal latch 146 with hook member 148, wherein latch 146 is preferably disposed on hinged door 144, and wherein hook member 148 is preferably disposed on venting chamber 142, as best illustrated in FIGS. 3-4. Hinged door 144 preferably functions to permit access into interior cavity 142A of venting chamber 142 for removal of or desired interaction with ash and/or other smoker particle vestiges deposited therein or sieved therethrough via passage of smoldered smoker particles through grate 106 of smoker chamber 100. Additionally, due to the smaller size of venting chamber 142 in comparison to prior art devices, accumulated ash and/or other smoker particle vestiges are removed therefrom with relative ease.

Figure 5:
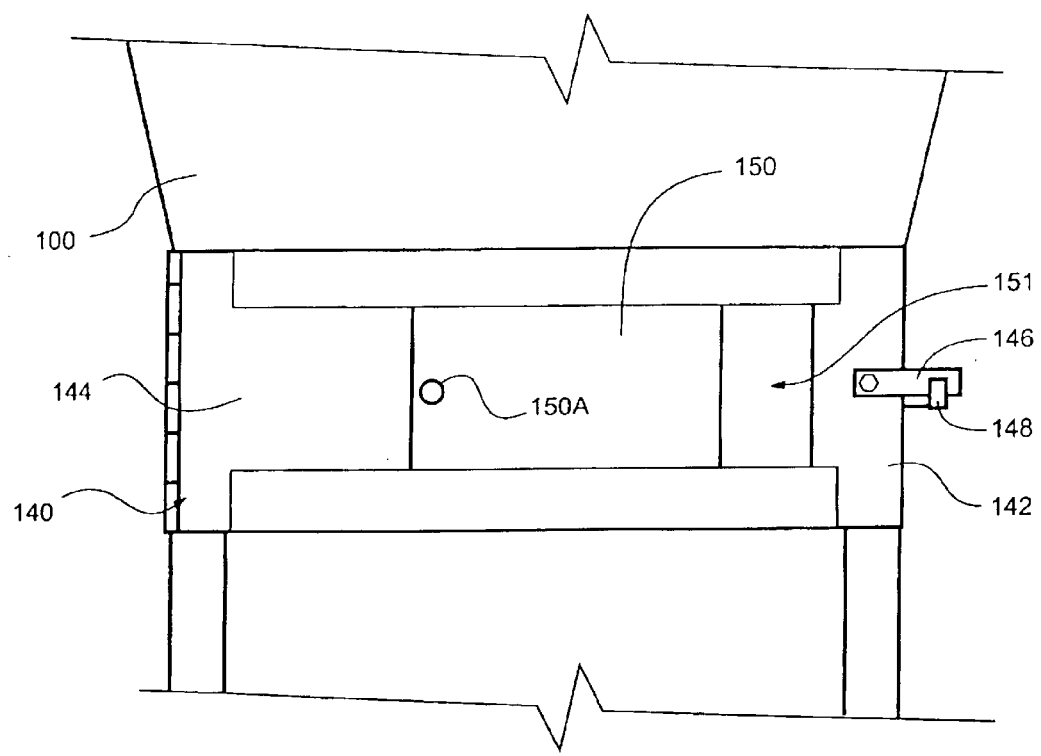
FIG. 5 is a partial side view of a combination grill and food smoker according to a preferred embodiment of the present invention.

Referring now more specifically to FIGS. 4–5, preferably disposed on hinged door 144 is slidably engaged venting door 150, having handle 150A to facilitate sliding of venting door 150 within hinged door 144, thus permitting the operator thereof to selectively adjust the width of the slot or aperture 151 formed through hinged door 144 upon slidable movement of venting door 150. Preferably, the amount of air permitted to flow through aperture 151 of hinged door 144 is a direct proportional function of the selected width of aperture 151 as regulated via slidable interaction of venting door 150 therewith. As more fully described below, the amount of air flowing through aperture 151 also affects the smoldering rate of smoker particles within smoker chamber 100.

Figure 6:
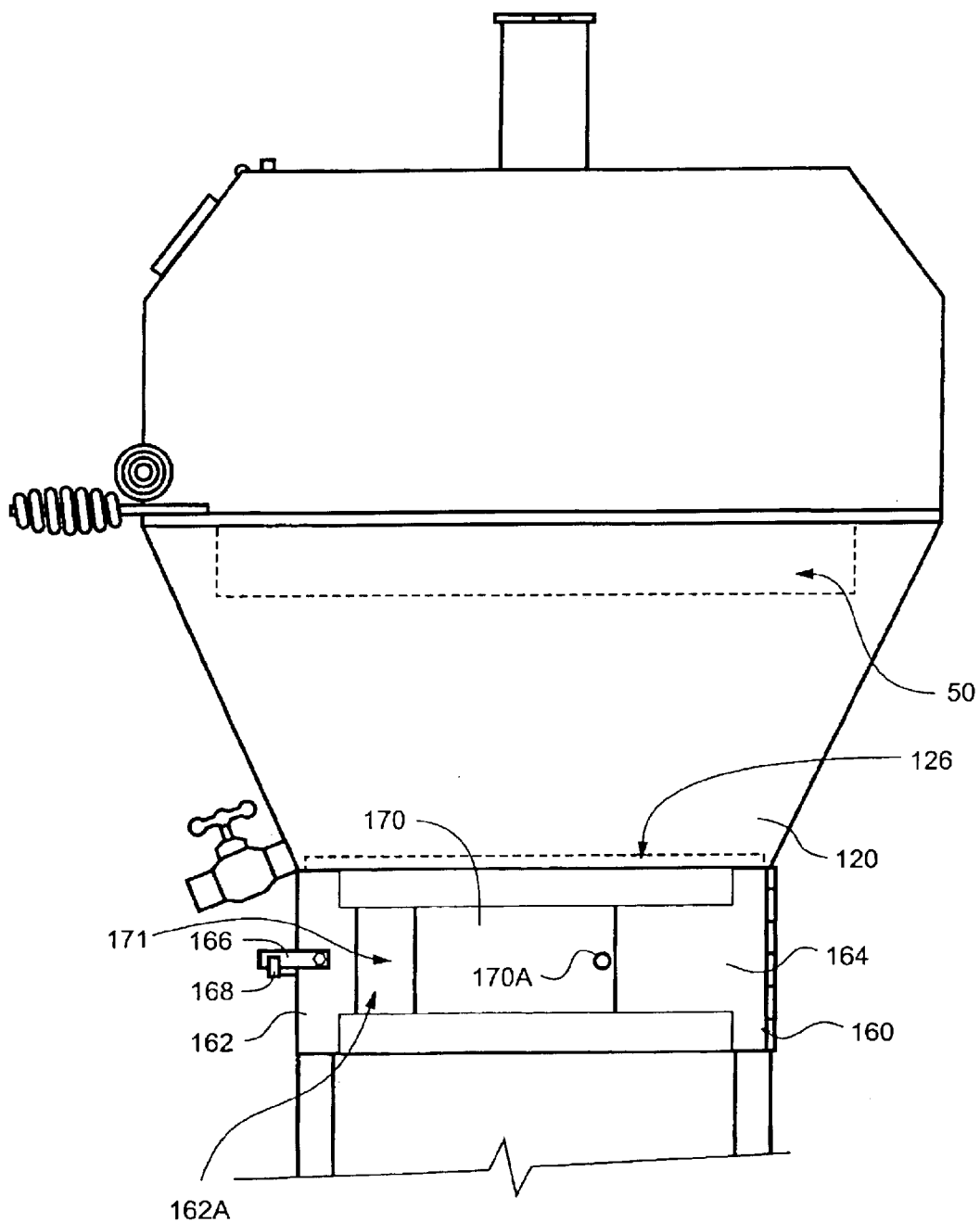
FIG. 6 is a partial side view of a combination grill and food smoker according to a preferred embodiment of the present invention.

Referring now to FIG. 6, similar to air regulatory means 140, air regulatory means 160 preferably possesses venting chamber 162 having hinged door 164, lockable thereto via interaction of pivotal latch 166 with hook member 168, wherein latch 166 is preferably disposed on hinged door 164, and wherein hook member 168 is preferably disposed on venting chamber 162. Hinged door 164 also preferably functions to permit access into interior cavity 162A of venting chamber 162 for removal of or desired interaction with ash and/or other smoker particle vestiges deposited therein or sieved therethrough via passage of smoldered smoker particles through grate 126 of smoker chamber 120. Additionally, due to the smaller size of venting chamber 162 in comparison to prior art devices, accumulated ash and/or other smoker particle vestiges are removed therefrom with relative ease.

Preferably disposed on hinged door 164 is slidably engaged venting door 170, having handle 170A to facilitate sliding of venting door 170 within hinged door 164, thus permitting the operator thereof to selectively adjust the width of the slot or aperture 171 formed through hinged door 164 upon slidable movement of venting door 170. Preferably, the amount of air permitted to flow through aperture 171 of hinged door 164 is a direct proportional function of the selected width of aperture 171 as regulated via slidable interaction of venting door 170 therewith. As more fully described below, the amount of air flowing through aperture 171 also affects the smoldering rate of smoker particles within smoker chamber 120.

The novel shape and configuration of smoker chambers 100 and 120 on grilling chamber 20, and the functional interaction of smoker chambers 100 and 120 with air regulatory means 140 and 160, respectively, ensures even dispersion of heat and smoke throughout grilling chamber 20 of apparatus 10, thus promoting the even cooking and flavoring of meats, fish, vegetables, or the like, therein. Specifically, heat and smoke generated from smoldering smoker particles (i.e., wood chips, or the like) within smoker chambers 100 and 120 is channeled and released into grilling chamber 20 via apertures 48 and 50, respectively, thereof. Preferably, air regulatory means 140 and 160 of smoker chambers 100 and 120, respectively, assist in controlling the smoldering rate of smoker particles within smoker chambers 100 and 120, respectively, by regulating the quantity of air permitted to pass through adjustable width apertures 151 and 171, respectively, of hinged doors 144 and 164, respectively, via slidable adjustment of venting doors 150 and 171, respectively, thereof. By regulating the quantity of air being introduced into smoker chambers 100 and 120, the rate of burning and/or smoldering of smoker particles contained therein is accordingly regulated, and thus, the amount of heat being released thereby.

Preferably, centrally disposed smoke stack 80 on grilling chamber 20 ensures that smoke released from both smoker chambers 100 and 120 into grilling chamber 20 is permitted to first travel uniformly therein, and thereafter be expelled therefrom via smoke stack 80. Pivotally adjustable lid 82 of smoke stack 80 permits selective adjustment of the ventilation and expelling of smoke and heat therefrom, and thus, assists in the regulation of the internal temperature of grilling chamber 20, and therefore, the rate of cooking of food/meats therein. Additionally, thermometers 30 and 32 visually assist the operator of apparatus 10 to determine the internal temperatures of zones proximal smoker chambers 100 and 120, respectively, thus enabling the operator to accordingly regulate the smoldering rate of smoker particles within smoker chambers 100 and 120 for sustaining a desired uniform internal temperature within interior space 24.

It is contemplated in an alternate embodiment that venting chambers 140 and 160 could be selectively adjusted such that two different temperatures zones are established within internal space 24, proximal smoker chambers 100 and 120.

It is contemplated in an alternate embodiment that apparatus 10 could possess a plurality of smoker chambers.

It is contemplated in an alternate embodiment that smoker chambers 100 and 120, in association with air regulatory means 140 and 160, respectively, could be situated on the front and rear sides of grilling chamber 20.

It is contemplated in an alternate embodiment that grilling chamber 20 could be completely encircled with a plurality of individual smoker chambers, or one continuous smoker chamber.

It is contemplated in an alternate embodiment that grilling chamber 20 could possess more than one smoke stack 80.

It is contemplated in an alternate embodiment that apparatus 10 could have a plurality of air regulating means.

It is contemplated in an alternate embodiment that grilling chamber 20 could house more than one slidably removable grilling grate 40.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A combination grill and food smoker, comprising:
   at least one grilling chamber;
   at least one smoke stack;
   at least one first smoker chamber in fluid communication with said at least one grilling chamber; and,
   at least one second smoker chamber in fluid communication with said at least one grilling chamber, wherein said at least one first smoker chamber and said at least one second smoker chamber are adapted to channel smoke generated therewithin throughout said at least one grilling chamber.

2. The combination grill and food smoker of claim 1, wherein said at least one first smoker chamber and said at least one second smoker chamber are substantially inverted-trapezoidal-shaped.

3. The combination grill and food smoker of claim 1, wherein said at least one smoke stack is centrally disposed on said at least one grilling chamber.

4. The combination grill and food smoker of claim 1, wherein said at least one first smoker chamber and said at least one second smoker chamber are opposingly positioned on said at least one grilling chamber.

5. The combination grill and food smoker of claim 1, wherein said at least one first smoker chamber and said at least one second smoker chamber are equally distanced from said at least one smoke stack, and wherein said at least one smoke stack is centrally positioned on said at least one grilling chamber.

6. The combination grill and food smoker of claim 1, further comprising at least one first air regulatory means in fluid communication with said at least one first smoker chamber.

7. The combination grill and food smoker of claim 6, wherein said at least one first air regulatory means is a venting chamber having at least one slidably adjustable door for regulating the quantity of air permitted to flow therethrough and into said at least one first smoker chamber.

8. The combination grill and food smoker of claim 1, further comprising at least one second air regulatory means in fluid communication with said at least one second smoker chamber.

9. The combination grill and food smoker of claim 8, wherein said at least one second air regulatory means is a venting chamber having at least one slidably adjustable door for regulating the quantity of air permitted to flow therethrough and into said at least one second smoker chamber.

10. The combination grill and food smoker of claim 1, wherein said at least one grilling chamber houses at least one slidably removable grilling grate.

11. The combination grill and food smoker of claim 1, further comprising at least one first thermometer positioned proximate to said at least one first smoker chamber, and at least one second thermometer positioned proximate to said at least one second smoker chamber.

12. A combination grill and food smoker, comprising:

at least one grilling chamber;

at least one smoke stack;

at least one first smoker chamber in fluid communication with said at least one grilling chamber;

at least one second smoker chamber in fluid communication with said at least one grilling chamber;

at least one first air regulatory means in fluid communication with said at least one first smoker chamber; and, at least one second air regulatory means in fluid communication with said at least one second smoker chamber, wherein said at least one first smoker chamber and said at least one second smoker chamber are adapted to channel smoke generated therewithin throughout said at least one grilling chamber.

13. The combination grill and food smoker of claim 12, wherein said at least one first smoker chamber and said at least one second smoker chamber are substantially inverted-trapezoidal-shaped.

14. The combination grill and food smoker of claim 12, wherein said at least one smoke stack is centrally disposed on said at least one grilling chamber.

15. The combination grill and food smoker of claim 12, wherein said at least one first smoker chamber and said at least one second smoker chamber are opposingly positioned on said at least one grilling chamber.

16. The combination grill and food smoker of claim 12, wherein said at least one first smoker chamber and said at least one second smoker chamber are equally distanced from said at least one smoke stack, and wherein said at least one smoke stack is centrally positioned on said at least one grilling chamber.

17. The combination grill and food smoker of claim 12, wherein said at least one first air regulatory means is a venting chamber having at least one slidably adjustable door for regulating the quantity of air permitted to flow therethrough and into said at least one first smoker chamber.

18. The combination grill and food smoker of claim 12, wherein said at least one second air regulatory means is a venting chamber having at least one slidably adjustable door for regulating the quantity of air permitted to flow therethrough and into said at least one second smoker chamber.

19. The combination grill and food smoker of claim 12, wherein said at least one grilling chamber houses at least one slidably removable grilling grate.

20. The combination grill and food smoker of claim 12, further comprising at least one first thermometer positioned proximate to said at least one first smoker chamber, and at least one second thermometer positioned proximate to said at least one second smoker chamber.

21. A combination grill and food smoker, comprising:

at least one grilling chamber;

at least one smoke stack;

at least one first smoker chamber in fluid communication with said at least one grilling chamber;

at least one second smoker chamber in fluid communication with said at least one grilling chamber;

at least one first air regulatory means in fluid communication with said at least one first smoker chamber;

at least one second air regulatory means in fluid communication with said at least one second smoker chamber;

at least one first thermometer positioned proximate to said at least one first smoker chamber; and, at least one second thermometer positioned proximate to said at least one second smoker chamber.

22. The combination grill and food smoker of claim 21, wherein said at least one first smoker chamber and said at least one second smoker chamber are substantially inverted-trapezoidal-shaped.

23. The combination grill and food smoker of claim 21, wherein said at least one smoke stack is centrally disposed on said at least one grilling chamber.

24. The combination grill and food smoker of claim 21, wherein said at least one first smoker chamber and said at least one second smoker chamber are opposingly positioned on said at least one grilling chamber.

25. The combination grill and food smoker of claim 21, wherein said at least one first smoker chamber and said at least one second smoker chamber are equally distanced from said at least one smoke stack, and wherein said at least one smoke stack is centrally positioned on said at least one grilling chamber.

26. The combination grill and food smoker of claim 21, wherein said at least one first air regulatory means is a venting chamber having at least one slidably adjustable door for regulating the quantity of air permitted to flow therethrough and into said at least one first smoker chamber.

27. The combination grill and food smoker of claim 21, wherein said at least one second air regulatory means is a venting chamber having at least one slidably adjustable door for regulating the quantity of air permitted to flow therethrough and into said at least one second smoker chamber.

28. The combination grill and food smoker of claim 21, wherein said at least one grilling chamber houses at least one slidably removable grilling grate.

29. A combination grill and food smoker, comprising:

at least one grilling chamber having a first side and a second side;

at least one first means for channeling smoke, said at least one first means for channeling carried by and disposed in fluid communication with said first side of said at least one grilling chamber; and, at least one second means for channeling smoke, said at least one second means for channeling carried by and disposed in fluid communication with said second side of said at least one grilling chamber, wherein said at least one first means for channeling and said at least one second means for channeling are adapted to channel smoke generated therewithin throughout said at least one grilling chamber.

* * * * *